(12) United States Patent
Sarma

(10) Patent No.: US 10,354,314 B1
(45) Date of Patent: Jul. 16, 2019

(54) RANKING OF ITEMS AS A FUNCTION OF VIRTUAL SHOPPING CART ACTIVITY

(71) Applicant: Amazon Technologies, Inc., Reno, NV (US)

(72) Inventor: Subramonia P. Sarma, Bellevue, WA (US)

( * ) Notice: Subject to any disclaimer, the term of this patent is extended or adjusted under 35 U.S.C. 154(b) by 1235 days.

(21) Appl. No.: 14/146,947

(22) Filed: Jan. 3, 2014

Related U.S. Application Data

(63) Continuation of application No. 12/816,409, filed on Jun. 16, 2010, now Pat. No. 8,645,221.

(51) Int. Cl.
*G06Q 30/00* (2012.01)
*G06Q 30/06* (2012.01)

(52) U.S. Cl.
CPC ......... *G06Q 30/0633* (2013.01); *G06Q 30/00* (2013.01); *G06Q 30/0601* (2013.01)

(58) Field of Classification Search
CPC . G06Q 30/00; G06Q 30/0601; G06Q 30/0633
See application file for complete search history.

(56) References Cited

U.S. PATENT DOCUMENTS

| | | | | |
|---|---|---|---|---|
| 6,076,108 A * | 6/2000 | Courts | ................ | G06F 17/3089 707/E17.116 |
| 6,185,558 B1 | 2/2001 | Bowman et al. | | |
| 6,223,215 B1 * | 4/2001 | Hunt | ................... | G06Q 30/02 709/203 |
| 6,480,894 B1 * | 11/2002 | Courts | ................ | G06F 17/3089 707/E17.116 |
| 7,295,995 B1 | 11/2007 | York et al. | | |
| 7,483,846 B1 | 1/2009 | Kumar et al. | | |
| 7,945,485 B2 | 5/2011 | Kane et al. | | |
| 8,330,759 B1 | 12/2012 | Besbeas et al. | | |
| 2002/0072980 A1 | 6/2002 | Dutta | | |
| 2002/0078191 A1 * | 6/2002 | Lorenz | ................... | H04L 29/06 709/223 |
| 2002/0178088 A1 * | 11/2002 | Lurie | ................... | G06Q 20/12 705/23 |
| 2006/0122917 A1 * | 6/2006 | Lokuge | ............. | G06F 17/30861 705/27.1 |
| 2012/0323682 A1 * | 12/2012 | Shanbhag | .......... | G06Q 30/0601 705/14.51 |
| 2014/0279215 A1 * | 9/2014 | Alvo | .................. | G06Q 30/0633 705/26.8 |

OTHER PUBLICATIONS

Melissa Campanelli "How to Set Up an E-Commerce Site" Mar. 27, 2006. Retrieved from https://www.entrepreneur.com/article/84250 (Year: 2006).*

(Continued)

*Primary Examiner* — Naeem U Haq
(74) *Attorney, Agent, or Firm* — Thomas|Horstemeyer, LLP

(57) ABSTRACT

Disclosed are various embodiments for ranking items in an electronic commerce system. A subset of a plurality of items is identified in at least one computing device, where the items are sold through an electronic commerce system. The items in the subset are ranked relative to each other based, at least in part, on the virtual shopping cart activity of a plurality of users with respect to the items.

17 Claims, 4 Drawing Sheets

(56) References Cited

OTHER PUBLICATIONS

Gerald L. Lohse et al. "Electronic Shopping", Communications of the ACM, Jul. 1998 / vol. 41, No. 7, pp. 81-88. (Year: 1998).*

Jongeun Kim et al. "Understanding Consumers' Online Shopping and Purchasing Behaviors" Oklahoma State University, Jul. 2004 (Year: 2004).*

Matt Cutler, et al. "E-Metrics Business Metrics for the New Economy", NetGenesis Corp. 2000.

* cited by examiner

RANKING OF ITEMS AS A FUNCTION OF VIRTUAL SHOPPING CART ACTIVITY

CROSS-REFERENCE TO RELATED APPLICATION

This application is a continuation of and claims priority to co-pending U.S. patent application entitled "RANKING OF ITEMS AS A FUNCTION OF VIRTUAL SHOPPING CART ACTIVITY," filed on Jun. 16, 2010, and assigned application Ser. No. 12/816,409, which is hereby incorporated herein by reference in its entirety.

BACKGROUND

Merchants who sell their products online, such as those who sell items through a website on the Internet, often provide listings of items for customers to browse to facilitate the selection of items for purchase. It can be the case that a user is presented with many items at once making it difficult to select an item they wish to purchase.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments of the present disclosure provide customers with the ability to view rank listings of items based at least in part upon shopping cart activity with respect to such items in the online presence of a merchant. In one embodiment, the shopping cart activity is examined for many customers with respect to multiple items. In the following discussion, a general description of the system and its components is provided, followed by a discussion of the operation of the same.

Figure 1:
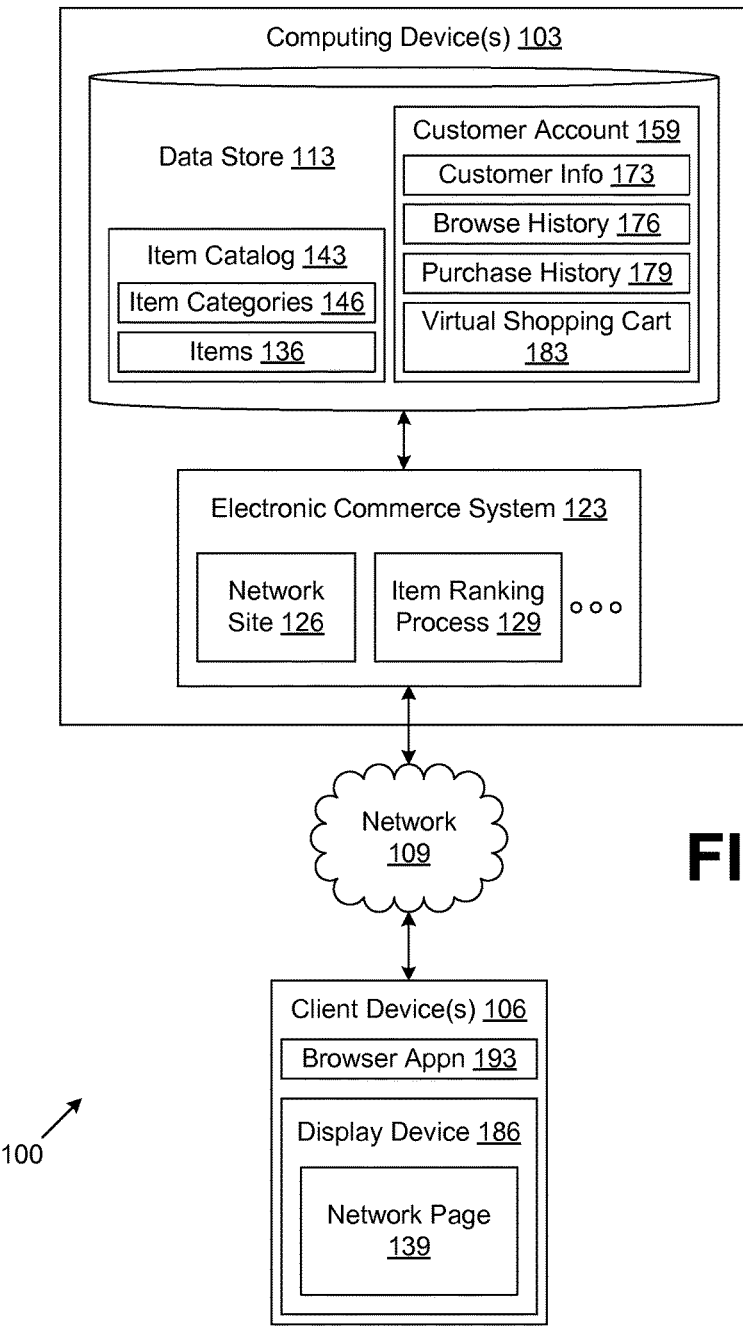
FIG. 1 is a drawing of a networked environment according to various embodiments of the present disclosure.

With reference to FIG. 1, shown is a networked environment 100 according to various embodiments. The networked environment 100 includes one or more computing devices 103 and one or more client devices 106, each of which is coupled to a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 such as multiple servers may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113 is associated, for example, with the operation of the various applications and/or functional entities described below.

The components executed on the computing device 103, for example, include an electronic commerce system 123 and other applications, services, processes, systems, engines, or functionality not discussed in detail herein. The electronic commerce system 123 includes various components such as an item ranking process 129 and other applications and processes as can be appreciated.

The electronic commerce system 123 is executed in order to facilitate the online purchase of items 136 over the network 109. To this end, the electronic commerce system 123 facilitates a network site 126 such as, for example, a website or other network presence on the network 109. The electronic commerce system 123 also performs various back-end functions associated with the online presence of a merchant in order to facilitate the online purchase of items 136. For example, the electronic commerce system 123 generates user interfaces and/or network pages 139 such as web pages or other types of network content that are provided to client devices 106 for the purposes of selecting items for purchase, rental, download, lease, or other form of consumption as will be described.

The electronic commerce system 123 is configured to facilitate selection of items 136 from an item catalog 143. The items 136 in the item catalog 143 may be organized into various item categories 146. The electronic commerce system 123 is configured to facilitate the viewing, selection, and purchase of items 136. From time to time, the electronic commerce system 123 may identify a subset of the items 136 that are presented to a customer for various purposes as will be described. In one embodiment, the item ranking process 129 is executed as a portion of the electronic commerce system 123 in order to facilitate a ranking of such a subset of items 136 as a function of virtual shopping cart activity with respect to such items 136 as will be described.

The data stored in the data store 113 includes, for example, the item catalog 143 of items 136 arranged in item categories 146, customer accounts 159, and potentially other data. Associated with each customer account 159 are customer information 173, a browse history 176, a purchase history 179, a virtual shopping cart 183, and potentially other data.

The item catalog 143 comprises a catalog of items 136 that are sold by merchants through the electronic commerce system 123. The electronic commerce system 123 provides for the online presence of the merchant on the network 109 such as through a website or other portal as can be appreciated. Associated with each of the items 136 in the item catalog 143 is a detailed description and other information that is presented to customers when viewing such items 136 during interaction with the electronic commerce system 123.

A customer account 159 exists for each of the customers who purchase items 136 through the electronic commerce system 123. The customer information 173 associated with each customer account 159 includes various information about the customer such as, for example, customer name, billing addresses, shipping addresses, payment instruments, wish lists, shopping carts, and other information. The browse history 176 includes information about the network pages 139 or other content viewed by the customer in the past while interacting with the electronic commerce system 123 in making purchases, "window shopping," or performing other tasks. The purchase history 179 includes information about the past purchases made by a given customer through the electronic commerce system 123.

The virtual shopping cart 183 comprises a list of items 136 selected by a customer for purchase through the network site 126 facilitated by the electronic commerce system 123. A customer may select items 136 during interaction with a network site provided by the electronic commerce system 123 to be added to the virtual shopping cart 183. Also, a customer may remove items 136 from the virtual shopping cart 183. A customer may proceed to a checkout process presented by the network site 126 to purchase some or all of the items 136 included in the virtual shopping cart 183 during a given session. To facilitate such action, in one embodiment the checkout process allows customers to select the items 136 currently in the virtual shopping cart 183 that they wish to purchase at the time of checkout. Thus, a customer does not necessarily have to purchase all items in a virtual shopping cart 183 when proceeding through the checkout process. In such a situation, the virtual shopping cart 183 can act as an ongoing list of items 136 in which a customer may be interested in purchasing at some time in the future as opposed to requiring that a customer purchase every item 136 they include in their virtual shopping cart 183.

In addition, there may be other data stored in the data store 113 associated with customers and other entities as can be appreciated.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client device 106 may be configured to execute various applications such as a browser application 193 and/or other applications. The browser application 193 may be executed in a client device 106, for example, to access and render network pages 139, such as web pages, or other network content served up by the computing device 103 and/or other devices or servers. Such network pages 139 or other content may be rendered on a display device 186 associated with the client device 106. The client device 106 may be configured to execute applications beyond browser application 193 such as, for example, email applications, instant message applications, and/or other applications.

Next, a general description of the operation of the various components of the networked environment 100 is provided. To begin, the electronic commerce system 123 is executed in the one or more computing devices 103 to provide for a network site 126 that facilitates electronic commerce. Specifically, the electronic commerce system 123 is configured to serve up various network pages 139 such as web pages or other types of network content to the client device 106 in response to requests from the browser application 193 or other application to conduct the sale of one or more items 136 sold through the electronic commerce system 123.

Various network pages 139 served up as part of the network site 126 facilitate the selection of items 136 to be purchased by customers. In facilitating a purchase of items 136, the electronic commerce system 123 maintains virtual shopping carts 183 for each customer in association with the respective customer accounts 159. In order to purchase items 136, the customer downloads various network pages 139 that include listings of a subset of the items 136 identified by the customer based upon a product search or by virtue of navigation through a taxonomy exposed on the network site 126.

During interaction with the network site 126 facilitated by the electronic commerce system 123, a customer may include various items 136 in their virtual shopping cart 183 in order to purchase such items 136. In some cases, items 136 may be added to or stored in a virtual shopping cart 183, but then not purchased. In such case, users may employ their virtual shopping cart 183 not just for purchasing items in a given session, but for ultimately designating items 136 to purchase sometime in the future in other sessions. In this respect, a "session" is defined as a time within which a customer interacts with the network site 126 using the client device 106, or maintains a connection with the network site 126 during a single log on.

Thus, according to various embodiments, as described herein, "virtual shopping cart activity" comprises the activity of a customer with respect to various items 136 that involves a virtual shopping cart 183. For example, virtual shopping cart activity may comprise adding items 136 into a shopping cart and ultimately purchasing items 136 added in the virtual shopping cart 183. Virtual shopping cart activity may also entail removing items 136 from a virtual shopping cart 183, or replacing items 136 in a virtual shopping cart 183 with alternatives. In addition, virtual shopping cart activity may entail other actions taken with respect to various items 136 relative to a virtual shopping cart 183.

In some situations, when a given network page 139 is generated that includes a listing of a subset of items 136 that is responsive, for example, to a product search or other designation of such subset of items 136, the electronic commerce system 123 encodes one or more graphical components in the respective network page 139 that facilitate the ranking of such items 136. In order to provide for the ranking of such items 136, the item ranking process 129 is configured to rank the subset of items 136 relative to each other as a function of various concepts as will be described. In one embodiment, the item ranking process 129 is configured to rank a subset of items 136 relative to each other as a function of the "virtual shopping cart activity" associated with the respective items 136 in the subset.

In one embodiment, the ranking of the items 136 is based at least in part upon a score generated for each respective one of the items 136 as included in the network page 139. To this end, the score for each item 136 is determined as a function of "virtual shopping cart activity" of all of the customers that purchase items 136 through electronic commerce system 123 for respective items 136. In another alternative, the item ranking process 129 may be configured to generate the scores indicative of virtual shopping cart activity that are ultimately used by other processes to rank items 136 relative to each other. Such processes may be implemented with the computing device 103 as a portion of the electronic commerce system 123, or in the client device 106, for example, as part of a network page 139 rendered by the browser application 193.

In one embodiment, the score indicative of virtual shopping cart activity of an item 136 may comprise an average time that the item 136 remains in respective virtual shopping carts 183. Alternatively, the item ranking process 129 may rank each of the items 136 in a given subset by calculating a score for such items 136 as a function of one or more factors. The average time that items 136 remain in respective virtual shopping carts 183 may be considered a single factor among others to consider. Assuming that multiple factors are considered, then items 136 in a subset may be ranked in accordance with the scores calculated from such multiple factors.

In one embodiment, one factor to consider in generating a score may comprise the percentage of times that a given item 136 has been added to a virtual shopping cart 183 when such item 136 is viewed in a network page 139. For example, items 136 may be viewed in an item detail page or other type of network page 139, as can be appreciated. Thus, it may be the case that many customers will view an item 136 multiple times, but will not actually include it in their virtual shopping cart 183, whereas others will do so. As a consequence, the percentage of times that items 136 are added to respective virtual shopping carts 183 when viewed is indicative of customer desire for the items 136. Thus, there is a nexus between this type of shopping cart activity and the marketability of a given item 136.

Another factor that may be considered to generate a score is the percentage of times that a respective one of the items 136 is added to a virtual shopping cart 183 when viewed during a single session. Thus, a given item 136 may be viewed multiple times in various network pages 139 in a given session. The viewing of an item 136 multiple times during a given session may indicate significant interest in the item 136 on the part of a customer. If an item 136 is ultimately selected to be included in a virtual shopping cart 183 during such as session, then such activity indicates a greater degree of desirability for the item 136. If the item 136 is viewed multiple times and is not included in a virtual shopping cart 183, then the activity may indicate a lesser degree of desirability for the item 136. Thus, the percentage of times that a given one of the items 136 is added to a virtual shopping cart 183 relative to the number of times the item 136 is viewed during a respective session may be used to determine a score based on virtual shopping cart activity. For example, a percentage of times may be determined that items 136 are included in a virtual shopping cart 183 when viewed a threshold number of times during a single session.

Still another factor that may be considered in generating a score may comprise the number of times that a respective one of the items 136 has been removed from a virtual shopping cart 183. To this end, such a factor may comprise a score calculated as a percentage of the times that a given item 136 has been removed from a virtual shopping cart 183 relative to the total number of times that the item 136 has been added to various virtual shopping carts 183.

In addition, a further factor to consider in generating a score may comprise a number of times a respective one of the items 136 remains in a virtual shopping cart 183 through a check out process without actually being purchased. In such a situation, a customer may habitually include items 136 in their virtual shopping cart 183 that they may wish to purchase in the future, but might not actually purchase such items 136 in the session in which such items 136 were added to the virtual shopping cart 183. Also, from time to time a customer may add other items 136 and proceed to purchase such added items 136 through the checkout process, while the earlier added items 136 remain in the virtual shopping cart 183. To this end, customers may be able to save multiple items 136 in a virtual shopping cart 183. Such customers may actually add other items 136 to the same virtual shopping cart 183 and proceed through the checkout process one or more times to purchase such other items 136 in the virtual shopping cart 183 while the saved items 136 remain in the virtual shopping cart 183. By passing over the purchase of an item 136 that is saved in a virtual shopping cart 183 one or more times, a customer may indicate a lesser desire for such items 136. Also, the price of such items 136 may be considered. For example, one may save a more expensive item 136 to a virtual shopping cart 183 while saving up the funds to purchase such an item 136. In such case, storage of an expensive item 136 in a virtual shopping cart 183 through multiple checkout cycles may indicate a strong desire for such an item 136. Such may especially be the case if a high percentage of such items 136 are ultimately purchased by customers in the end.

In addition, another factor that may be considered to generate a score involves the number of times a respective item 136 in a virtual shopping cart 183 has been replaced with an alternative one of the items 136. If, in a given session, a respective one of the items 136 is removed from the virtual shopping cart 183 and an alternative one of the items 136 is added to the virtual shopping cart 183, where the alternative one of the items 136 is competitive with respect to the item 136 that was removed, then the removed item 136 may be deemed to have been replaced by the alternative item 136.

The score may simply comprise the number of times that an item 136 has been replaced. Alternatively, the score may be calculated as a percentage of times the item 136 has been replaced relative to the total number of times an item 136 is added to a virtual shopping cart 183. In addition, a score may be generated based upon the replacement of items 136 in some other manner as can be appreciated. The replacement of items 136 may occur in a single session or over multiple sessions. For instance, a replacement may occur within a single session, or an item 136 may be removed and a competitive item 136 added during separate sessions as can be appreciated.

Still further, another factor that may be considered to generate a score may comprise an average quantity of a given item 136 that is added to a virtual shopping cart 183. The fact that items 136 may be purchased in greater quantities at a given time may indicate a stronger desire for such items 136.

Also, for some electronic commerce systems 123, the virtual shopping carts 183 may be configured to expire after a predefined period of inactivity or other expiration threshold. When such virtual shopping carts 183 expire, the items 136 that have been saved to such virtual shopping carts 183 are deleted. Thus, another factor to consider in generating a score may comprise the number of times respective items 136 are deleted due to the expiration of a virtual shopping cart 183 without being purchased. This may actually indicate a lesser degree of interest in such items 136 since they were not ultimately purchased after they were added to a virtual shopping cart 183.

Yet another factor to consider in generating the score may comprise the average time a given item 136 spends in virtual shopping carts 183 relative to the average time other items 136 spend in the same virtual shopping carts 183. This factor may be expressed in terms of an average number of days an item 136 spends in virtual shopping carts 183 relative to the average number of days other items 136 spend in the same virtual shopping carts 183. This factor may be expressed as a ratio, a time differential, or some other expression. In one embodiment, the "other items" 136 may only be items 136 falling in the same category as an item 136 under consideration, or all other items 136 may be considered.

In addition, another factor may involve generating a score based upon a frequency division that maintains a number of instances a respective one of the items 136 is stored in virtual shopping carts 183 over multiple time ranges. In such case, such a frequency distribution may be specified to include several ranges of time such as, for example, 0-30 days, 31-60 days, 61-90 days, and so on. For each item 136, the number of occurrences that the item 136 falls within each range is tabulated, where a single value indicating the number of occurrences is maintained for each range defined.

Thus, for a given item 136, for example, there may be X number of instances of such item 136 being stored in virtual shopping carts 183 between 0 and 30 days, Y number of instances where such item 136 has been stored in the virtual shopping cart 183 from 31-60 days, and so on. Ultimately, given a predefined frequency distribution, a score may be calculated as a function of the frequency distribution of the virtual shopping cart activity with respect to each item 136. To this end, the values associated with respective ranges may be weighted based on experience, with whether such items 136 are likely to be purchased given past sales experience and an appropriate mathematical function may be applied to come up with an overall relative score based on all of the values from all of the ranges.

Such mathematical function and weighting may take into account, for example, that items 136 that are stored within the virtual shopping cart 183 within certain time periods are more likely to be purchased as opposed to items 136 that have been stored in virtual shopping carts 183 for other time periods. For example, if an item 136 has been stored within a virtual shopping cart 183 for less than 30 days, it may be more likely to be purchased than an item 136 that has been stored in a virtual shopping cart 183 for a whole year. This is because the storage of an item 136 for a whole year as such may indicate that the customer may not be terribly serious about purchasing such an item 136. Alternatively, this may not be the case given the pricing of an item 136 as mentioned above.

Given that a number of scores associated with various factors related to virtual shopping cart activity may be obtained as described above, the same may be applied to a function to generate an overall score such as, for example, a weighted function as follows:

$$\text{Score}=W_1 f_1 + W_2 f_2 + W_3 f_3 + \ldots + W_N f_N,$$

Where W comprises predefined weights generated for each factor, and $f_N$ comprises a function employed to generate a particular score for a respective factor. In one embodiment, a constant may be placed in the location of the function $f_N$. Alternatively, the scores generated for the various factors may be used to calculate overall scores in some other manner as can be appreciated.

Figure 2:
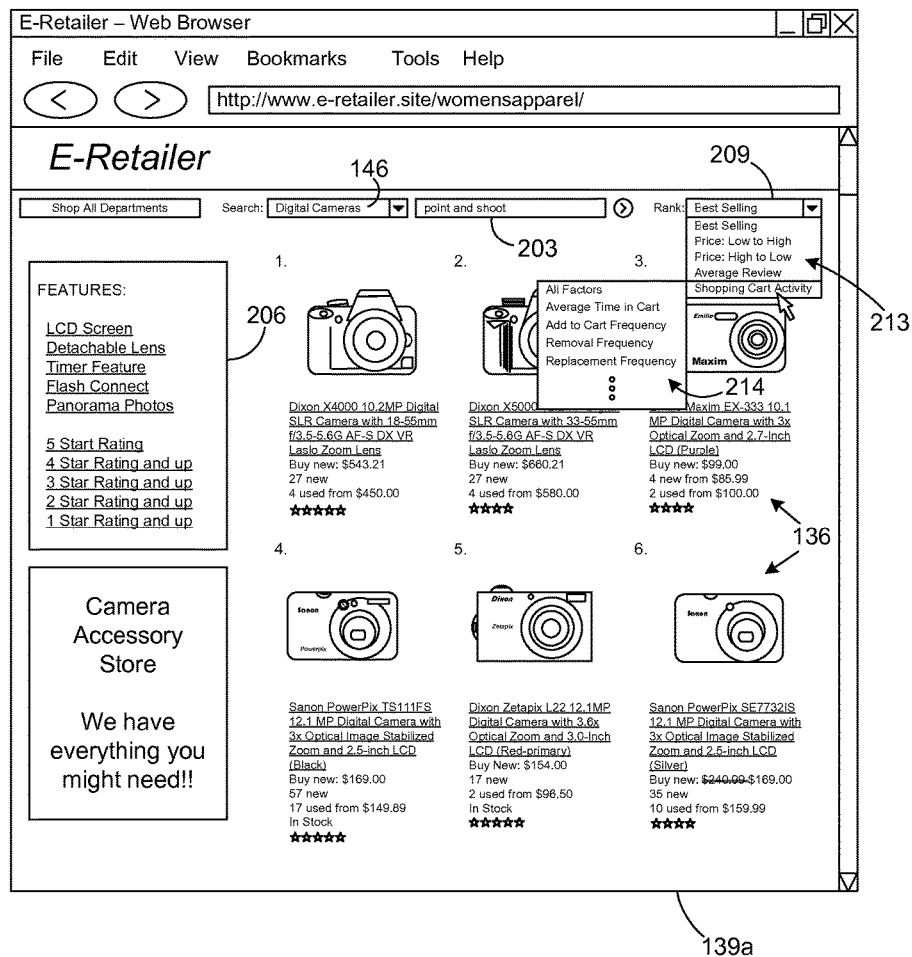
FIG. 2 is a drawing of an example of a user interface rendered by a client in the networked environment of FIG. 1 according to various embodiments of the present disclosure.

Referring next to FIG. 2, shown is one example of a network page 139 (FIG. 1), denoted herein as network page 139a, according to various embodiments. The network page 139a includes a listing of items 136. In the example shown, the listing of the items 136 comprises of listing of digital cameras. The listing of digital cameras is generated in response to a search performed based upon the search terms "point and shoot" as shown. Also, the search is limited to the item category 146 of "Digital Cameras." To this end, the search terms are entered in a search text box 203 in order to execute the search, where such search terms are shown in the search text box 203 in the results network page 139a to inform the customer of the search performed.

It should be noted that the listing of items 136 may comprise some type of listing other than search results as described with reference to FIG. 2, where the listing of search results as described with reference to FIG. 2 merely provides an example in order to illustrate the various embodiments of the present disclosure.

The network page 139a includes concepts 206 within a taxonomy that comprise links that may be selected to limit the items 136 listed in the network page 139a. The network page 139a also lists the initial six items 136 from among the subset of items 136 that are included in the network page 139a responsive to the search that was performed.

The network page 139a also includes a ranking selection component 209. The ranking selection component 209 facilitates the selection of an approach to ranking the items 136 displayed in the network page 139a. In ranking such items 136, they are ranked or sorted in a predefined order based upon the specific criteria indicated in the ranking selection component 209. In this respect, the ranking selection component 209 includes several different ranking options 213. The items 136 listed in the network page 139a are numbered in accordance with the ranking or sorting performed based upon the selection in the ranking selection component 209. In addition, for one or more of the ranking selection components 209, there may be a plurality of ranking subcomponents 214 that appear in one or more cascaded pick lists.

The ranking options 213 include options for ranking the items 136 according to the best selling, based on price of such items 136, based upon reviews submitted by customers, and based on shopping cart activity as shown. In addition, there may be other ranking options 213 beyond those described herein. The best selling ranking option 213 ranks the items 136 in accordance with sales velocity of such items 136 over a predefined period of time. The price-based ranking options 213 facilitate the listing of items 136 from lowest price to the highest price, or vice versa.

The average review ranking option 213 ranks the items 136 in accordance with values indicating an averaging of review scores submitted for the respective items 136 by customers. The shopping cart activity ranking option 213 ranks the items 136 in accordance with the scores generated that are probative of the shopping cart activity associated with each of the items 136 as described above. The ranking subcomponents 214 provide for a more detailed specification of how items 136 are to be ranked based upon the respective type of shopping cart activity indicated.

Figure 3:
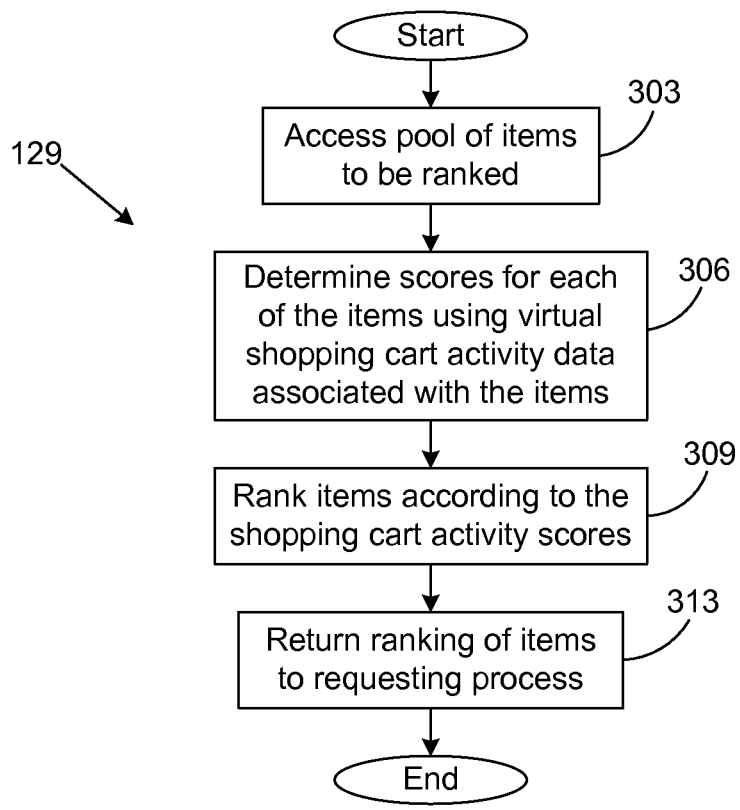
FIG. 3 is a flowchart illustrating one example of functionality implemented as portions of an item ranking process executed in a computing device in the networked environment of FIG. 1 according to various embodiments of the present disclosure.

Referring next to FIG. 3, shown is a flowchart that provides one example of the operation of a portion of the item ranking process 129 according to various embodiments. It is understood that the flowchart of FIG. 3 provides merely an example of the many different types of functional arrangements that may be employed to implement the operation of the portion of the item ranking process 129 as described herein. As an alternative, the flowchart of FIG. 3 may be viewed as depicting an example of steps of a method implemented in the computing device 103 (FIG. 1) according to one or more embodiments.

The functionality depicted in FIG. 3 assumes that the item ranking process 129 generates scores indicative of virtual shopping cart activity for each of the items 136 (FIG. 1) identified in a subset that is to be sent to the client device 106 (FIG. 1) in the form of the network page 139 (FIG. 1) such as the network page 139a (FIG. 2).

Beginning with box 303, the item ranking process 129 accesses the subset of items 136 to be ranked. This may be done at the request of a process that is generating the network page 139 that includes the listing of items 136 that may need to be ranked as described above. Then, in box 306, scores are determined for each of the items 136 as a function of the virtual shopping cart activity associated with such items 136 as described above. Thereafter, the items may be ranked in accordance with the shopping cart activity scores. In another alternative, no ranking may occur, where the scores are simply associated with the items 136. In such a case, the actual ranking of the items 136 may occur in the client device 106 upon selection of the shopping cart activity ranking option 213 (FIG. 2) associated with the network page 139a, as described above.

In this respect, the ranking of such items 136 may occur local to the client device 106 as opposed to within the computing devices 103. Thereafter, in box 313, the ranking of such items 136 is returned to a requesting process that is generating the respective network page 139a. Alternatively, in situations where ranking is performed locally on a client device 106, then the scores indicative of the virtual shopping cart activity of each of the items 136 is returned, where ranking occurs at a later time on the client device 106. Thereafter, this portion of the item ranking process 129 ends as shown.

Figure 4:
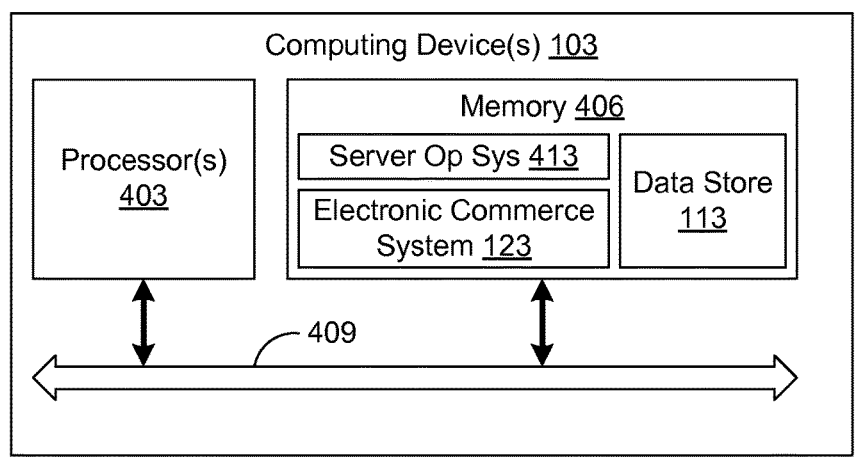
FIG. 4 is a schematic block diagram that provides one example illustration of a computing device employed in the networked environment of FIG. 1 according to various embodiments of the present disclosure.

With reference to FIG. 4, shown is a schematic block diagram that provides an example of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce system 123, including the item ranking process 129, and potentially other applications. Also stored in the memory 406 may be a data store 113 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the electronic commerce system 123, including the item ranking process 129, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the item ranking process 129. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein such as the electronic commerce system 123, including the item ranking process 129, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   an application executable by the at least one computing device that facilitates a selection of a plurality of items, wherein the application, when executed, causes the at least one computing device to at least:
      track a plurality of sessions corresponding to a plurality of users, individual ones of the plurality of sessions storing user interactions with a network site, wherein the user interactions comprise a record of a virtual shopping cart activity associated with individual ones of the plurality of items;
      rank a subset of the plurality of items based at least in part upon the virtual shopping cart activity, wherein the virtual shopping cart activity is based at least in part upon an average amount of time that a respective one of the plurality of items has been added to a virtual shopping cart by the plurality of users over a particular period of time; and
      generate, in response to a request from a client device over a network, a network page to display the plurality of items in an order that is based at least in part on the rank of the subset of the plurality of items.

2. The system of claim 1, wherein the virtual shopping cart activity further comprises a proportion of times that the respective one of the plurality of items is added to the virtual shopping cart when viewed in a network page generated by the at least one computing device.

3. The system of claim 1, wherein the virtual shopping cart activity further comprises a proportion of user sessions that the respective one of the plurality of items is added to the virtual shopping cart when viewed in a session generated by the at least one computing device.

4. The system of claim 1, wherein the virtual shopping cart activity further comprises a number of times that the respective one of the plurality of items is removed from the virtual shopping cart.

5. The system of claim 1, wherein the virtual shopping cart activity further comprises a number of times the respective one of the plurality of items remains in the virtual shopping cart through a portion of a checkout process without being purchased.

6. The system of claim 1, wherein the virtual shopping cart activity further comprises a number of times the respective one of the plurality of items is removed from the virtual shopping cart and an alternative one of the plurality of items is added to the virtual shopping cart, where the alternative one of the plurality of items is competitive with the respective one of the plurality of items removed from the virtual shopping cart.

7. The system of claim 6, wherein the removal of the respective one of the plurality of items from the virtual shopping cart and addition of the alternative one of the plurality of items to the virtual shopping cart occur during a single session.

8. The system of claim 1, wherein the virtual shopping cart activity further comprises a frequency distribution stored in a memory for the respective one of the plurality of items, the frequency distribution maintaining a number of instances that the respective one of the plurality of items is stored in a plurality of virtual shopping carts over a plurality of time ranges.

9. A method comprising:
- identifying, via at least one of one or more computing devices, a plurality of items offered for sale via an electronic commerce system;
- tracking a plurality of sessions corresponding to a plurality of users, individual ones of the plurality of sessions storing user interactions with a network site, wherein the user interactions comprise a record of a virtual shopping cart activity associated with individual ones of a plurality of items;
- ranking, via at least one of the one or more computing devices and in response to a request from a client device over a network, the plurality of items based at least in part on a virtual shopping cart activity of a plurality of users with respect to the plurality of items, wherein the virtual shopping cart activity is based at least in part upon an average amount of time that respective ones of the plurality of items are added to at least one virtual shopping cart by the plurality of users over a particular period of time, wherein a response to the request from the client device over the network causes ranking, via the client device, the plurality of items based at least in part on the virtual shopping cart activity of the plurality of users with respect to the plurality of items; and
- generating, via at least one of the one or more computing devices, a network page to display the plurality of items in an order that is based at least in part on the rank of the plurality of items.

10. The method of claim 9, wherein the virtual shopping cart activity further comprises a proportion of times that the respective one of the plurality of items is added to the at least one virtual shopping cart when viewed in a network page.

11. The method of claim 9, wherein the virtual shopping cart activity further comprises a proportion of user sessions in which the respective one of the plurality of items is added to the at least one virtual shopping cart.

12. The method of claim 9, wherein the virtual shopping cart activity further comprises a number of times that the respective one of the plurality of items is removed from the at least one virtual shopping cart.

13. The method of claim 9, wherein the virtual shopping cart activity further comprises a number of that times the respective one of the plurality of items remains in the at least one virtual shopping cart through a portion of a checkout process without being purchased.

14. The method of claim 9, wherein the virtual shopping cart activity further comprises a number of times that the at least one virtual shopping cart expires while including the respective one of the plurality of items.

15. The method of claim 9, wherein the virtual shopping cart activity further comprises a first average time the respective one of the plurality of items has been placed in the at least one virtual shopping cart relative to a second average time other ones of the plurality of items have been placed in the at least one virtual shopping cart.

16. A non-transitory computer-readable medium embodying a program executable in at least one computing device, the program, when executed, causing the at least one computing device to at least:
- identify a plurality of items offered for sale via an electronic commerce system;
- track a plurality of sessions corresponding to a plurality of users, individual ones of the plurality of sessions storing user interactions with a network site, wherein the user interactions comprise a record of a virtual shopping cart activity associated with individual ones of the plurality of items;
- rank the plurality of items based at least in part on the virtual shopping cart activity of the plurality of users with respect to the plurality of items, wherein the virtual shopping cart activity is based at least in part upon an average amount of time that the individual ones of the plurality of items are added to at least one virtual shopping cart by the plurality of users over a particular period of time; and
- generate a network page to display the plurality of items in an order that is based at least in part on the rank of the plurality of items.

17. The non-transitory computer-readable medium of claim 16, wherein the virtual shopping cart activity is further based at least in part upon a proportion of user sessions in which the individual one of the plurality of items is placed within the at least one virtual shopping cart.

* * * * *